US009740085B2

United States Patent
Shen

(10) Patent No.: US 9,740,085 B2
(45) Date of Patent: Aug. 22, 2017

(54) OPTICAL ELEMENT ADJUSTING APPARATUS AND PROJECTOR USING THE SAME

(71) Applicant: Coretronic Corporation, Hsin-Chu (TW)

(72) Inventor: Chien-Chi Shen, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 136 days.

(21) Appl. No.: 14/752,509

(22) Filed: Jun. 26, 2015

(65) Prior Publication Data
US 2016/0062218 A1    Mar. 3, 2016

(30) Foreign Application Priority Data

Sep. 1, 2014    (TW) .............................. 103130144 A

(51) Int. Cl.
| | |
|---|---|
| G03B 21/14 | (2006.01) |
| G02B 7/182 | (2006.01) |
| G03B 21/20 | (2006.01) |
| G02B 7/00 | (2006.01) |
| G03B 21/00 | (2006.01) |

(52) U.S. Cl.
CPC ........... G03B 21/142 (2013.01); G02B 7/003 (2013.01); G02B 7/1822 (2013.01); G03B 21/2066 (2013.01); G03B 21/005 (2013.01)

(58) Field of Classification Search
CPC ........ G03B 21/14; G03B 21/00; G03B 21/20; G02B 7/00; G02B 7/18; G02B 7/19
See application file for complete search history.

(56) References Cited

U.S. PATENT DOCUMENTS

| 7,871,167 B2 | 1/2011 | Amano et al. |
| 2012/0294326 A1 | 11/2012 | Seibert |
| 2014/0268069 A1* | 9/2014 | Takahashi ............ G03B 21/142 353/31 |

FOREIGN PATENT DOCUMENTS

| CN | 2305687 Y | 1/1999 |
| CN | 2840265 Y | 11/2006 |
| CN | 101464552 A | 6/2009 |
| CN | 101598853 A | 12/2009 |
| CN | 100589023 C | 2/2010 |
| CN | 103217788 A | 7/2013 |

(Continued)

*Primary Examiner* — William C Dowling
*Assistant Examiner* — Danell L Owens
(74) *Attorney, Agent, or Firm* — Li-Jen Shen

(57) ABSTRACT

An optical element adjusting apparatus configured to support an optical element includes an adjusting base, a fixed base and locking elements. The adjusting base includes a first through hole disposed on a center of gravity of the adjusting base, a second through hole and a third through hole. An extension direction of a first straight line passing through the first through hole and the second through hole is different from an extension direction of a second straight line passing through the first through hole and the third through hole. The fixed base includes coupling holes corresponding to the first, second, third through holes. The locking elements pass though the first, second, third through holes respectively and are coupled to the coupling holes to couple the adjusting base to the fixed base. The adjusting base includes a support side away from the fixed base to support the optical element.

19 Claims, 5 Drawing Sheets

(56) References Cited

FOREIGN PATENT DOCUMENTS

| CN | 103558675 A | 2/2014 |
|----|-------------|--------|
| JP | 2004233688 A | 8/2004 |
| JP | 2008292888 A | 12/2008 |
| JP | 2013134405 A | 7/2013 |
| TW | 566792 U | 12/2003 |
| TW | 200419211 A | 10/2004 |

* cited by examiner

OPTICAL ELEMENT ADJUSTING APPARATUS AND PROJECTOR USING THE SAME

FIELD OF THE INVENTION

The invention relates to an optical element adjusting apparatus and a projector using the same, and more particularly to an optical element adjusting apparatus capable of being adjusted in 3-axis directions and a projector using the same.

BACKGROUND OF THE INVENTION

A projection device, such as a projector, provides an illumination light beam via an illumination system, then converts the illumination light beam to an image light beam via a light valve, and projects the image light beam onto a projection screen via a projection lens, so as to display an image on the projection screen.

In order to place the components of the projection device properly, in the conventional techniques, a reflective element is used to adjust a transmission path of the illumination light beam. The reflective element is usually fixed to an adjusting apparatus for fine adjustment of a placement angle of the reflective element to effectively correct optical path errors which is caused by assembly tolerances. The optical path is the transmission path of the illumination light beam and/or the image light beam. Some patents or patent application publications disclose the adjusting apparatus for supporting a reflective element, such as U.S. Pat. No. 7,871,167, China patent No. CN2305687Y and China patent application publication No. CN100589023 C.

However, the conventional adjusting apparatus can only rotate the reflective element within a fixed range of angles in 2-axis directions. For example, the reflective element can only be rotated with respect to a horizontal axis and a vertical axis which are respectively parallel to a long side and a short side of a reflective surface of the reflective element, thereby limiting improvement effect of correction of the optical path errors.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention provides an optical element adjusting apparatus capable of being adjusted in 3-axis directions.

The invention further provides a projector using an optical element adjusting apparatus capable of being adjusted in 3-axis directions to effectively correct optical path errors.

Other advantages and objects of the invention may be further illustrated by the technical features broadly embodied and described as follows.

In order to achieve one or a portion of or all of the objects or other objects, an embodiment of the invention provides an optical element adjusting apparatus, which is configured to support an optical element and includes an adjusting base, a fixed base and multiple locking elements. The adjusting base includes a first through hole, a second through hole and a third through hole, wherein the first through hole is disposed on a center of gravity of the adjusting base. An extension direction of a first straight line, which passes through the first through hole and the second through hole, is different from an extension direction of a second straight line, which passes through the first through hole and the third through hole. The fixed base includes multiple coupling holes respectively corresponding to the first through hole, the second through hole and the third through hole. The locking elements pass through the first through hole, the second through hole and the third through hole respectively and are coupled to the coupling holes, so as to couple the adjusting base to the fixed base. The adjusting base includes a support side which is away from the fixed base and configured to support the optical element.

In one embodiment of the invention, the adjusting base further includes a rear side opposite to the support side, wherein the first through hole, the second through hole and the third through hole pass through the adjusting base from the rear side to the support side.

In one embodiment of the invention, the optical element is a reflective element.

In one embodiment of the invention, the optical element adjusting apparatus further includes multiple elastic elements respectively disposed around the locking elements and abutted between the fixed base and the adjusting base.

In one embodiment of the invention, the adjusting base includes multiple first limiting grooves, and the fixed base includes multiple second limiting grooves corresponding to the first limiting grooves respectively. Two ends of each of the elastic elements are disposed in the corresponding first limiting groove and the corresponding second limiting groove respectively.

In one embodiment of the invention, the locking elements are screws, and the coupling holes are threaded holes.

In one embodiment of the invention, each of the first through hole, the second through hole and the third through hole includes a first hole portion and a second hole portion, the second hole portion is communicated with the first hole portion and is near the fixed base. A diameter of the first hole portion is larger than a diameter of the second hole portion, each of the locking elements includes a screw head and a screw rod connected to the screw head. An outer diameter of the screw head is larger than the diameter of the second hole portion and smaller than the diameter of the first hole portion, and an outer diameter of the screw rod is smaller than the diameter of the second hole portion.

In one embodiment of the invention, each of the first through hole, the second through hole and the third through hole further includes a tapered hole portion disposed between the first hole portion and the second hole portion, wherein a diameter of the tapered hole portion is gradually reduced in a direction from the first hole portion to the second hole portion to form a first arc surface on a hole wall of the tapered hole portion.

In one embodiment of the invention, a surface of each of the screw heads, which faces to the first arc surface, is a second arc surface corresponding to the first arc surface.

In one embodiment of the invention, the optical element adjusting apparatus further includes an elastic sheet and a limiting element. The elastic sheet is disposed between the fixed base and the adjusting base, fixed to the adjusting base, and has several abutting portions. The adjusting base further includes several fourth through holes, and the abutting portions respectively pass through the adjusting base via the fourth through holes and abut against a first surface of the optical element. The limiting element is disposed on the support side of the adjusting base and covers an edge of a second surface of the optical element, wherein the first surface is opposite to the second surface.

In one embodiment of the invention, the elastic sheet further includes a fifth through hole. The locking element passing through the first through hole further passes through the fifth through hole.

The invention further provides a projector which includes an illumination system, a light valve and a projection lens, wherein the illumination system is configured to provide an illumination light beam and includes an optical element and the abovementioned optical element adjusting apparatus. The optical element is disposed on the support side of the adjusting base of the optical element adjusting apparatus and configured to change optical characteristics or a transmission path of the illumination light beam. The light valve is disposed on the transmission path of the illumination light beam and configured to convert the illumination light beam to an image light beam. The projection lens is disposed on a transmission path of the image light beam.

In the optical element adjusting apparatus of embodiments of the invention, because the first through hole is disposed on the center of gravity of the adjusting base, the adjusting base can be moved toward or away from the fixed base by adjusting the tightness of the locking element passing through the first through hole. Thus, the optical element disposed on the adjusting base not only can be rotated but also can be moved toward or away from the fixed base along an optical axis. Moreover, by adjusting the tightness of the locking element passing through the second through hole, the adjusting base can be rotated within a fixed range of angles around the second straight line which is served as a rotating axis. By adjusting the tightness of the locking element passing through the third through hole, the adjusting base can be rotated within a fixed range of angles around the first straight line which is served as another rotating axis. Therefore, the optical element adjusting apparatus of the embodiments of the invention can be adjusted in 3-axis directions. Since the projector of the embodiments of the invention uses the optical element adjusting apparatus capable of being adjusted in 3-axis directions, optical path errors of the projector can be effectively corrected.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
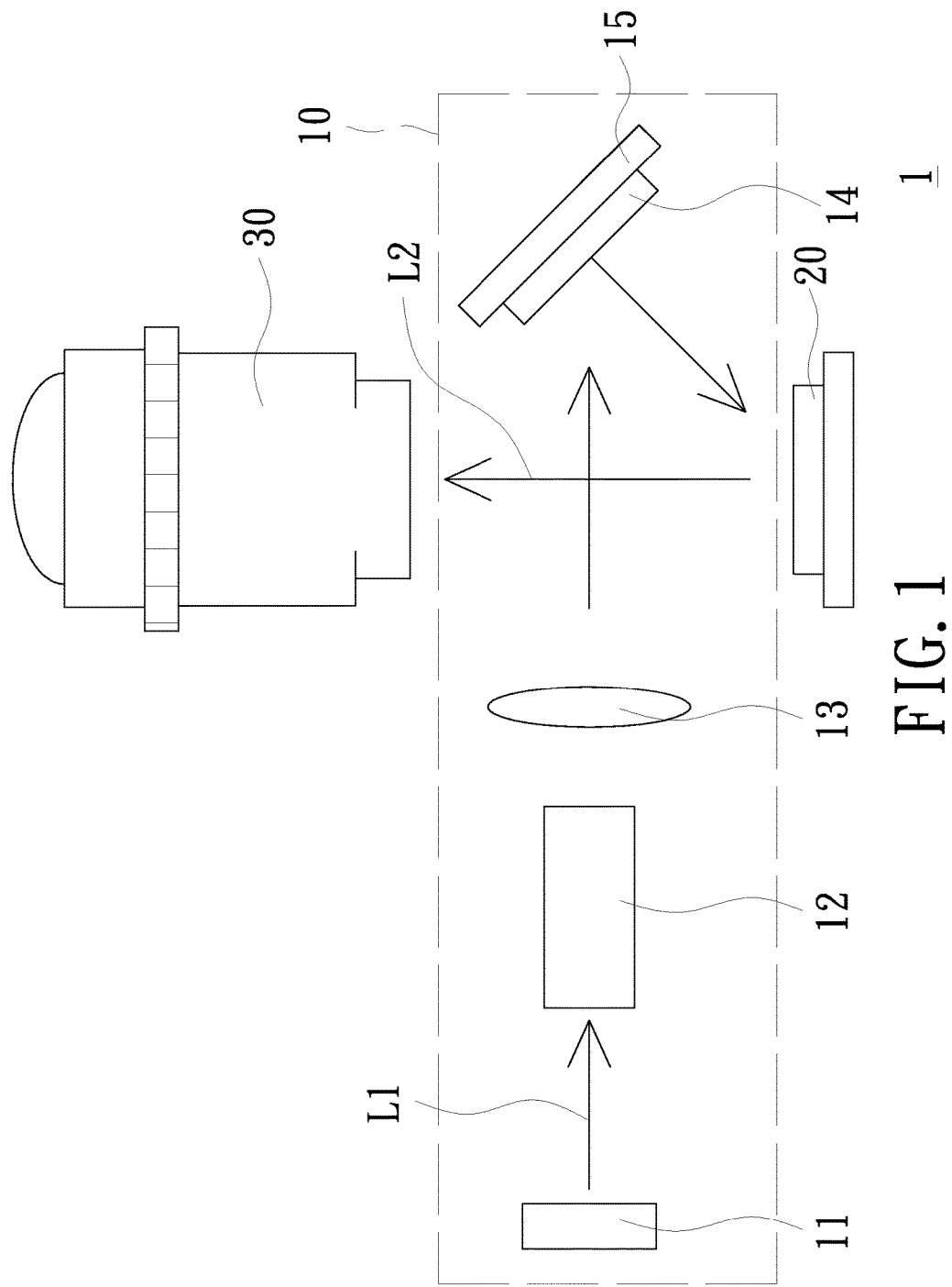
FIG. 1 is a schematic structural view of a projector in accordance with an embodiment of the invention.

FIG. 1 is a schematic structural view of a projector in accordance with an embodiment of the invention. Please refer to FIG. 1. A projector 1 includes an illumination system 10, a light valve 20 and a projection lens 30, wherein the illumination system 10 is configured to provide an illumination light beam L1, and the light valve 20 is disposed on a transmission path of the illumination light beam L1 to convert the illumination light beam L1 to an image light beam L2. The light valve 20 is, for instance, a reflective light valve such as a digital micro-mirror device (DMD) or a liquid crystal on silicon panel (LCOS panel). In other embodiments, the reflective light valve can be replaced by a transmissive light valve such as a transmissive liquid crystal panel, and the positions of the relevant elements of the projector should be adjusted appropriately. The projection lens 30 is disposed on a transmission path of the image light beam L2 to project the image light beam L2 onto a projection screen (not shown in FIG. 1), so as to display an image on the projection screen.

In this embodiment, the illumination system 10 includes a light source 11 and several optical elements such as a light integration rod 12, a lens 13 and a reflective element 14. The light source 11 is configured to provide the illumination light beam L1, and the optical elements are configured to change optical characteristics or the transmission path of the illumination light beam L1 to let the illumination light beam L1 transmit to the light valve 20. For example, the light integration rod 12 is configured to homogenize the illumination light beam L1, the lens 13 is configured to converge or diverge the illumination light beam L1, and the reflective element 14 is configured to reflect the illumination light beam L1 to change the transmission path of the illumination light beam L1. The illumination system 10 of this embodiment further includes an optical element adjusting apparatus 15 configured to support one of the optical elements. In this embodiment, the optical element supported by the optical element adjusting apparatus 15 is, for instance, the reflective element 14. The reflective element 14 is, for example, a reflective mirror. However, the optical element supported by the optical element adjusting apparatus 15 is not limited to the reflective element 14. The optical element adjusting apparatus 15 may be used to support another optical element in accordance with design requirements. It should be noted that types and number of the elements of the illumination system 10 as shown in FIG. 1 disclosed herein are only for the purpose of describing particular examples, and the illumination system of the invention is not limited thereto.

Figure 2:
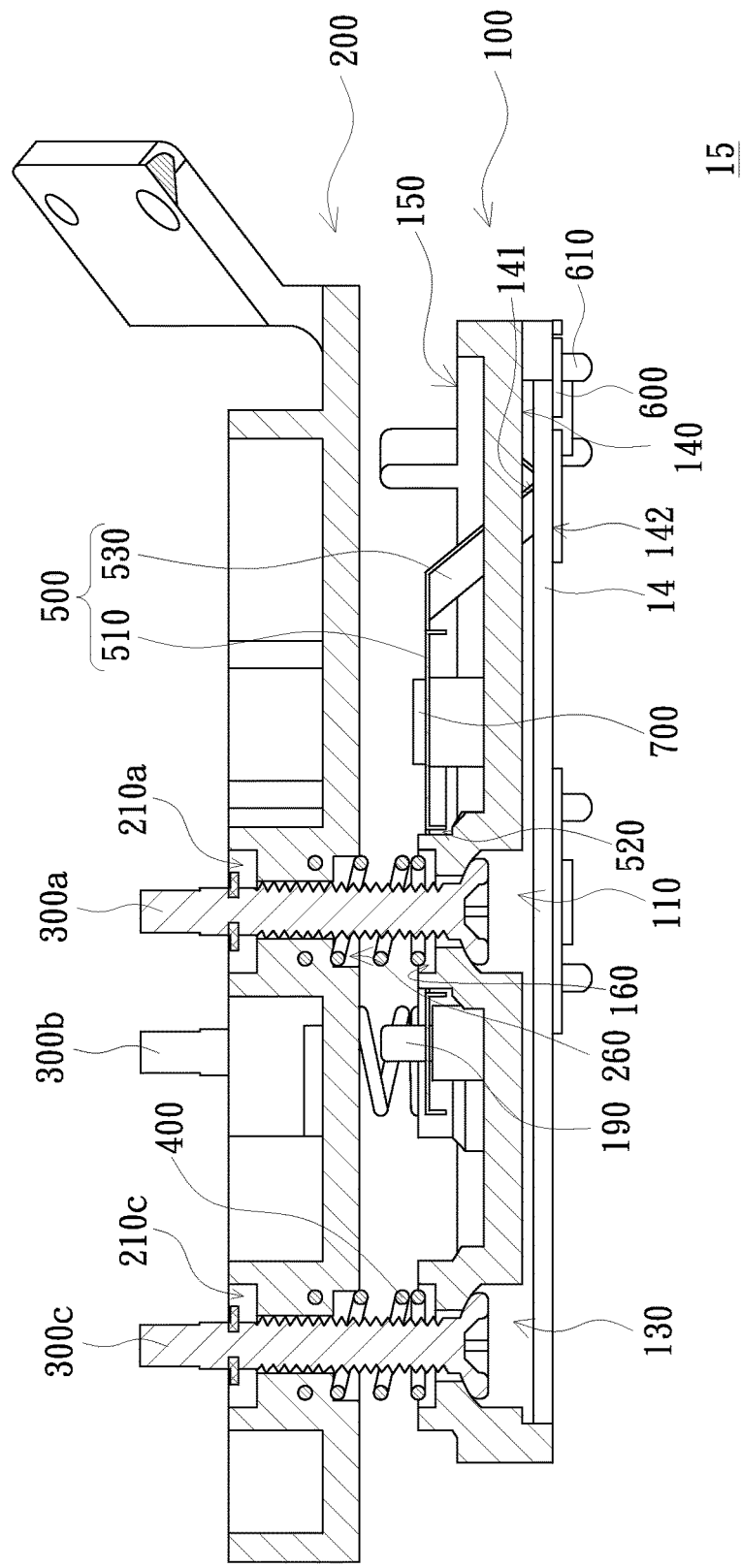
FIG. 2 is a schematic cross-sectional view of an optical element adjusting apparatus and a reflective element in accordance with an embodiment of the invention.
Figure 3:
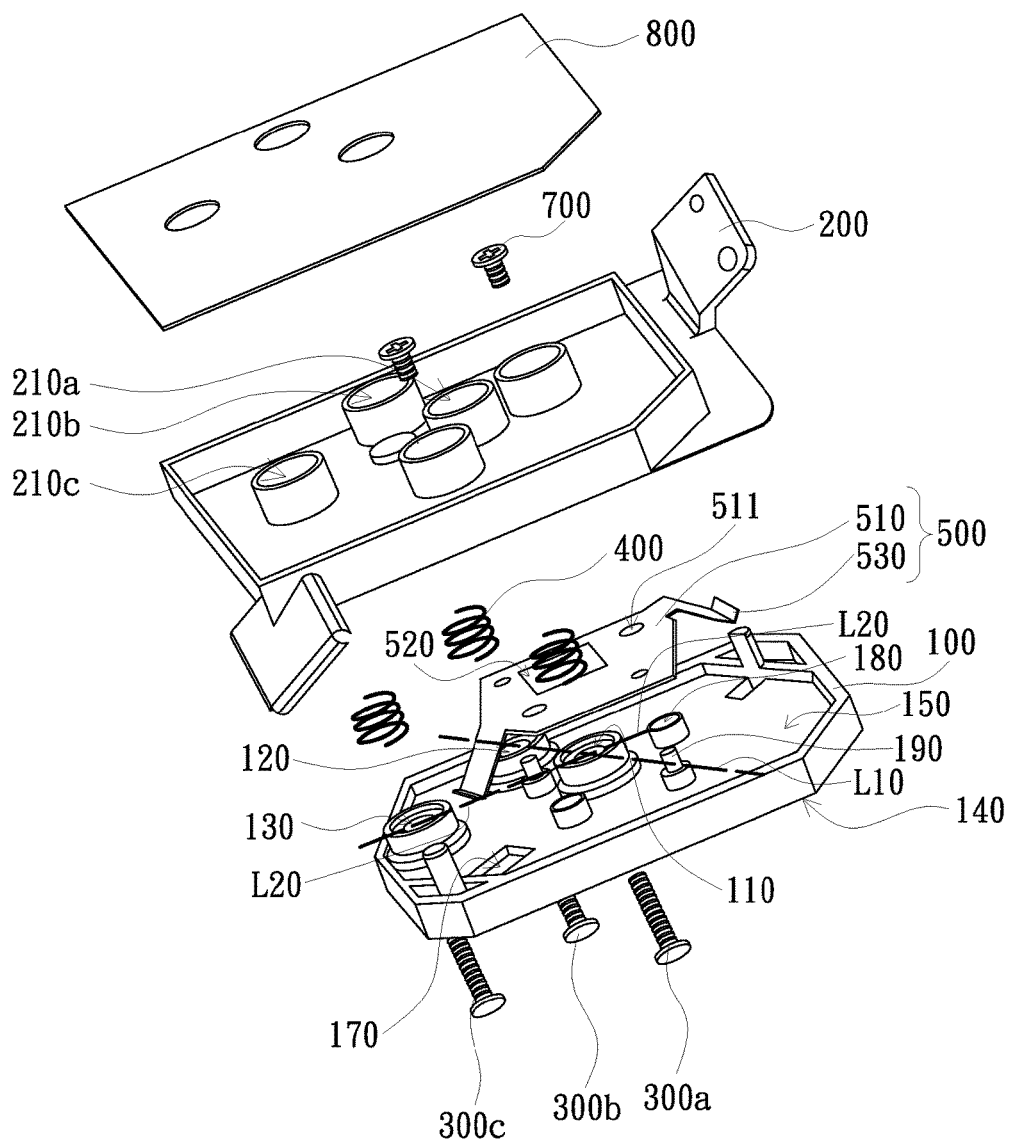
FIG. 3 is a schematic exploded view of an optical element adjusting apparatus in accordance with an embodiment of the invention.

FIG. 2 is a schematic cross-sectional view of an optical element adjusting apparatus and a reflective element in accordance with an embodiment of the invention. FIG. 3 is a schematic exploded view of an optical element adjusting apparatus in accordance with an embodiment of the invention. Please refer to FIGS. 2 and 3 simultaneously. The optical element adjusting apparatus 15 of this embodiment includes an adjusting base 100, a fixed base 200 and multiple locking elements 300a, 300b and 300c. The adjusting base 100 includes a first through hole 110, a second through hole 120 and a third through hole 130. The first through hole 110 is disposed on a center of gravity of the adjusting base 100, and as shown in FIG. 2, an extension direction of a first straight line L10, which passes through the first through hole 110 and the second through hole 120 is different from an extension direction of a second straight line L20, which passes through the first through hole 110 and the third through hole 130. The fixed base 200 includes multiple coupling holes 210a, 210b and 210c respectively corresponding to the first through hole 110, the second through hole 120 and the through hole 130. The locking elements 300a, 300b and 300c respectively pass through the first through hole 110, the second through hole 120 and the through hole 130 and are coupled to the corresponding coupling holes 210a, 210b and 210c, so as to couple the adjusting base 100 to the fixed base 200. More specifically, the locking element 300a passes through the first through hole 110 and is coupled to the coupling hole 210a, the locking element 300b passes through the second through hole 120 and is coupled to the coupling hole 210b, and the locking element 300c passes through the third through hole 130 and is coupled to the coupling hole 210c. The adjusting base 100 includes a support side 140 which is away from the fixed base 200 and configured to support the reflective element 14.

In one embodiment, the adjusting base 100 includes, for instance, a rear side 150 opposite to the support side 140. The first through hole 110, the second through hole 120 and the through hole 130 pass through the adjusting base 100 from the support side 140 to the rear side 150. The locking elements 300a, 300b and 300c, which respectively pass through the first through hole 110, the second through hole 120 and the through hole 130, for instance, insert into the adjusting base 100 from the support side 140 to the rear side 150, so as to couple to the coupling holes 210a, 210b and 210c of the fixed base 200 respectively. The locking elements 300a, 300b and 300c are, for instance, screws, and the coupling holes 210a, 210b and 210c are, for instance, threaded holes, however, the invention is not limited thereto. Detailed structures of the locking elements 300a, 300b and 300c and the coupling holes 210a, 210b and 210c will be described below.

In one embodiment, the optical element adjusting apparatus 15 may further include, for instance, multiple elastic elements 400 which are respectively disposed around the locking elements 300a, 300b and 300c and abutted between the adjusting base 100 and the fixed base 200, so as to provide support force between the adjusting base 100 and the fixed base 200. In this embodiment, the elastic elements 400 can be, but not limited to, springs. As shown in FIG. 2, in order to fix the elastic elements 400 to the adjusting base 100 securely, in one embodiment, the adjusting base 100 includes, for instance, multiple first limiting grooves 160, and the fixed base 200 includes, for instance, multiple second limiting grooves 260 corresponding to the first limiting grooves 160 respectively. Two ends of each of the elastic elements 400 are disposed in the corresponding first limiting groove 160 and the corresponding second limiting groove 260 respectively. The first limiting grooves 160 communicate with and correspond to the first through hole 110, the second through hole 120 and the through hole 130 of the adjusting base 100 respectively, and the second limiting grooves 260 communicate with and correspond to the coupling holes 210a, 210b and 210c of the fixed base 200 respectively. In other embodiment, the optical element adjusting apparatus 15 may include only one elastic element 400 which is disposed around the locking element 300a. The adjusting base 100 may include only one first limiting groove 160. The fixed base 200 may include only one second limiting groove 260. Two ends of the elastic element 400 are disposed in the corresponding first limiting groove 160 and the corresponding second limiting groove 260 respectively.

In one embodiment, the optical element adjusting apparatus 15 may further include, for instance, an elastic sheet 500 and a limiting element 600 (as shown in FIG. 2 only), wherein the elastic sheet 500 is disposed between the adjusting base 100 and the fixed base 200 and fixed to the adjusting base 100. Specifically, referring to FIGS. 2 and 3 simultaneously, the adjusting base 100 includes, for instance, multiple locking holes 180 and multiple location pillars 190. The elastic sheet 500 includes a fixed portion 510 which has multiple through-holes 511 corresponding to the locking holes 180 and the location pillars 190. Some of the through-holes 511 are disposed around the location pillars 190. The optical element adjusting apparatus 15 may further include multiple elastic sheet locking elements 700, such as screws, which respectively pass through the other through-holes 511 and lock into the corresponding locking holes 180, so as to fix the elastic sheet 500 to the adjusting base 100. The elastic sheet 500 may further include, for instance, a fifth through hole 520. The fifth through hole 520 is, for instance, defined on the fixed portion 510 of the elastic sheet 500. Therefore, the locking element 300a, which passes through the first through hole 110, can pass through the elastic sheet 500 via the fifth through hole 520. The elastic sheet 500 may be made of flexible material such as metal or plastic, however, the invention is not limited thereto. In one embodiment, the adjusting base 100 may include, for instance, multiple fourth through holes 170. The elastic sheet 500 further includes several abutting portions 530. The abutting portions 530 are, for instance, extended from the fixed portions 510. The abutting portions 530 pass through the adjusting base 100 via the fourth through holes 170 respectively and are abutted against a first surface 141 of the reflective element 14. In addition, the limiting element 600 is disposed on the support side 140 of the adjusting base 100 and covers edges of a second surface 142 of the reflective element 14, wherein the first surface 141 is opposite to the second surface 142, and the second surface 142 is a reflective surface.

Please refer to FIG. 2. The limiting element 600 is, for instance, a baffle or a sheet, which is locked to the adjusting base 100 by the locking element 610. The locking element 610 is exemplary a screw. Because the elastic sheet 500 and the limiting element 600 are respectively abutted against the first surface 141 and second surface 142 of the reflective element 14, the reflective element 14 is securely fixed on the support side 140 of the adjusting base 100.

In one embodiment, the optical element adjusting apparatus 15 may further include a dust cover 800 (as shown in FIG. 3 only) covering a side of the fixed base 200 away from the adjusting base 100.

Figure 4:
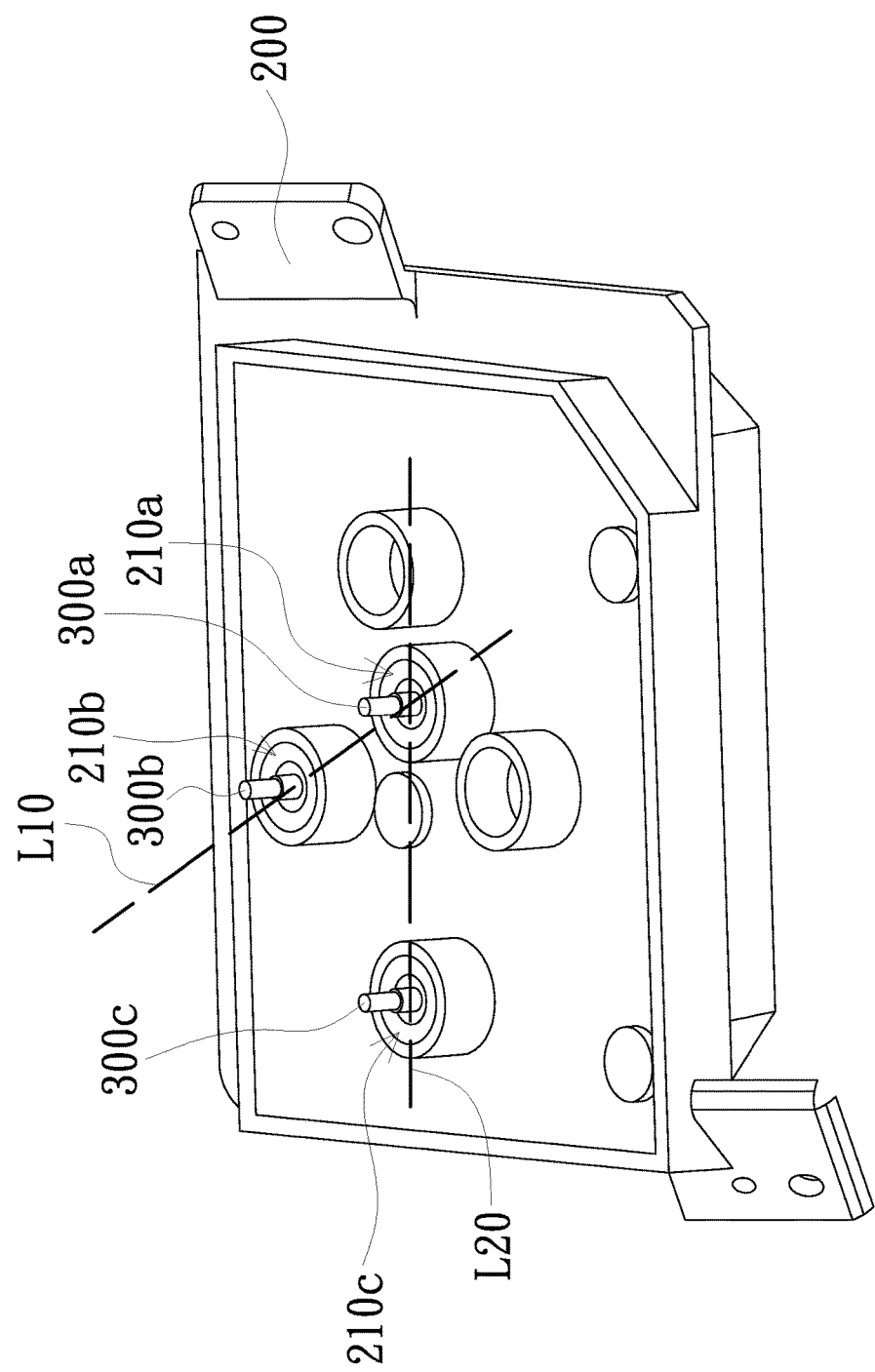
FIG. 4 is a schematic structural view showing positions of a first through hole, a second through hole and a third through hole of an optical element adjusting apparatus in accordance with an embodiment of the invention.

FIG. 4 is a schematic structural view showing positions of a first through hole, a second through hole and a third through hole of an optical element adjusting apparatus in accordance with an embodiment of the invention. Please refer to FIGS. 3 and 4 simultaneously. Because the first through hole 110 is disposed on the center of gravity of the adjusting base 100, while adjusting the tightness of the locking element 300a which passes through the first through hole 110, a distance between the adjusting base 100 and the fixed base 200 is changed, so as to move the adjusting base 100 toward or away from the fixed base 200. Moreover, the first straight line L10 which passes through the first through hole 110 and the second through hole 120 is formed as a first rotating axis. While adjusting the tightness of the locking element 300c which passes through the third through hole 130, the adjusting base 100 can be rotated within a fixed range of angles around the first rotating axis to change the relative angle between the adjusting base 100 and the fixed base 200, thereby changing the disposed angle of the reflective element 14 (as shown in FIG. 2). Moreover, the second straight line L20 which passes through the first through hole 110 and the third through hole 130 is formed as a second rotating axis. While adjusting the tightness of the locking element 300b which passes through the second through hole 120, the adjusting base 100 can be rotated within a fixed range of angles around the second rotating axis to change the relative angle between the adjusting base 100 and the fixed base 200, thereby changing the disposed angle of the reflective element 14 (as shown in FIG. 2).

Compared with the conventional technique, the adjusting base 100 of the optical element adjusting apparatus 15 of this embodiment can not only be rotated around 2-axis directions, but also move along another axis direction which is perpendicular to the 2-axis directions back and forth, so as to effectively correct errors in optical paths of the projector 1 (as shown in FIG. 1). Therefore, the imaging quality of the projector 1 can be improved.

It should be noted that an included angle between the first straight line L10 and the second straight line L20 is, for instance, not a right angle in this embodiment. In another embodiment, the included angle between the first straight line L10 and the second straight line L20 may be a right angle. The included angle between the first straight line L10 and the second straight line L20 is adjustable in accordance with different requirements, and the present invention is not limited thereto.

In this embodiment, structures of the locking elements 300a, 300b and 300c are, for instance, the same; structures of the coupling holes 210a, 210b and 210c are, for instance, the same; structures of the first through hole 110, the second through hole 120 and the third through hole 130 are, for instance, the same. The followings will describe the structures of the locking elements 300a, 300b and 300c, the coupling holes 210a, 210b and 210c and the first through hole 110, the second through hole 120 and the third through hole 130 in detail by using the locking element 300c, the coupling hole 210c and the third through hole 130 as an example. However, it should be noted that, in another embodiment, structures of the locking elements 300a, 300b and 300c may not be the same; structures of the coupling holes 210a, 210b and 210c may not be the same; structures of the first through hole 110, the second through hole 120 and the third through hole 130 may not be the same.

Figure 5:
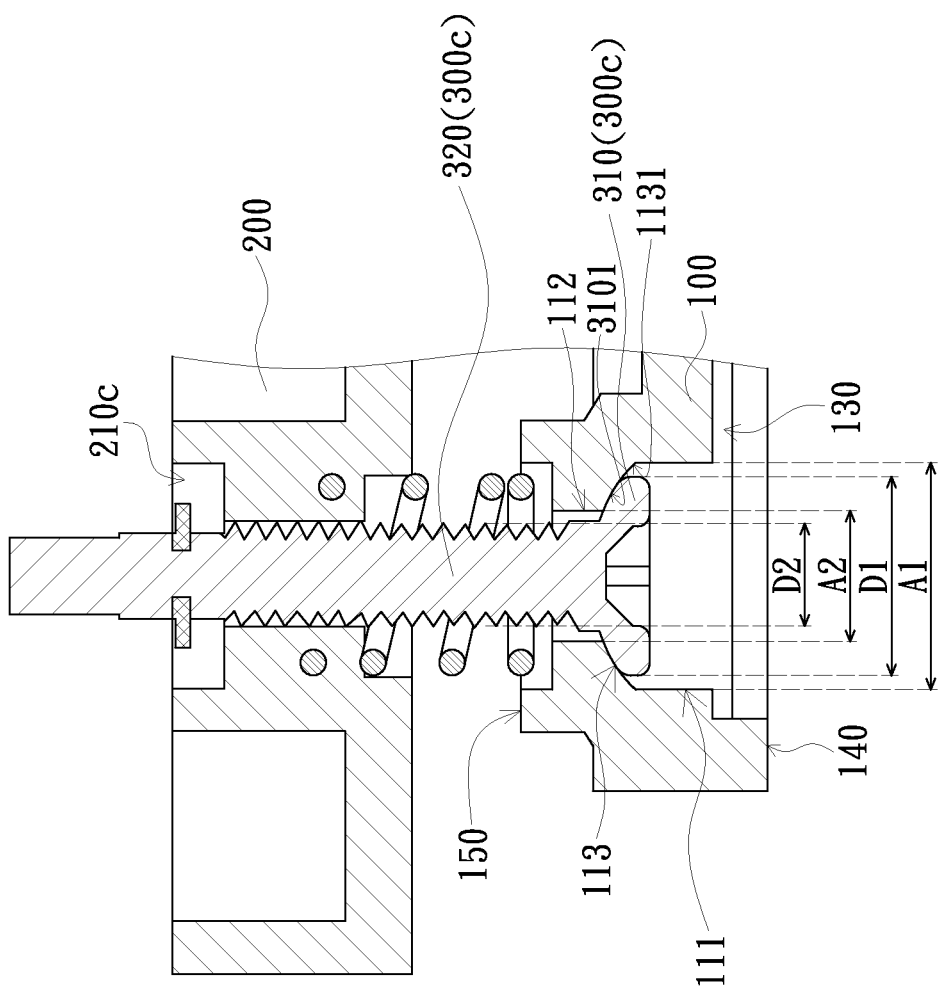
FIG. 5 is a partly enlarged schematic cross-sectional view of an adjusting base and a fixed base of an optical element adjusting apparatus in accordance with an embodiment of the invention.

FIG. 5 is a partly enlarged schematic cross-sectional view of an adjusting base and a fixed base of an optical element adjusting apparatus in accordance with an embodiment of the invention. Please refer to FIGS. 2 and 5. The third through hole 130 includes, for instance, a first hole portion 111 and a second hole portion 112 communicated with the first hole portion 111, wherein the second hole portion 112 is near the fixed base 200, and a diameter A1 of the first hole portion 111 is larger than a diameter A2 of the second hole portion 112. The locking element 300c includes a screw head 310 and a screw rod 320 connected to the screw head 310. An outer diameter D1 of the screw head 310 is larger than the diameter A2 of the second hole portion 112 and smaller than the diameter Al of the first hole portion 111. An outer diameter D2 of the screw rod 320 is smaller than the diameter A2 of the second hole portion 112, so that while the locking element 300c, which passes through the third through hole 130, is inserted from the support side 140 of the adjusting base 100, the screw head 310 is stopped at the first hole portion 111 and the screw rod 320 is inserted through the second hole portion 112 to pass through the rear side 150 of the adjusting base 100 and coupled to the coupling hole 210c of the fixed base 200.

In this embodiment, the third through hole 130 may further include a tapered hole portion 113 disposed between the first hole portion 111 and the second hole portion 112 and communicates with the first hole portion 111 and the second hole portion 112. A diameter D3 of the tapered hole portion 113 is gradually reduced in a direction from the first hole portion 111 to the second hole portion 120 to form a first arc surface 1131 on a hole wall of the tapered hole portion 113. Furthermore, a surface of the screw head 310, which faces to the first arc surface 1131, is a second arc surface 1132 corresponding to the first arc surface 1131. While the adjusting base 100 is rotated around the first rotating axis or the second rotating axis, even though the adjusting base 100 is tilted relative to the fixed base 200, the locking element 300c can be correspondingly tilted relative to the adjusting base 100, thereby preventing from reducing a maximum moving distance of the locking element 300c while screwing the locking element 300c, so as to further prevent from reducing a maximum rotating angle or a maximum moving distance of the adjusting base 100.

In summary, in the optical element adjusting apparatus of the embodiments of the invention, because the first through hole is disposed on the center of gravity of the adjusting base, the adjusting base can be moved toward or away from the fixed base by adjusting the tightness of the locking element passing through the first through hole. Moreover, by adjusting the tightness of the locking element passing through the second through hole, the adjusting base can be rotated within the fixed range of angles around the second straight line served as the rotating axis. By adjusting the tightness of the locking element passing through the third through hole, the adjusting base can be rotated within the fixed range of angles around the first straight line served as another rotating axis. Therefore, the optical element adjusting apparatus of the embodiments of the invention can be adjusted in 3-axis directions. Since the projector of the embodiment of the invention uses the optical element adjusting apparatus capable of being adjusted in 3-axis directions, optical path errors of the projector can be effectively corrected, thereby improving imaging quality of the projector.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An optical element adjusting apparatus, which is configured to support an optical element, comprising:
an adjusting base, comprising a first through hole, a second through hole, a third through hole, a support side and a rear side opposite to the support side, wherein the first through hole, the second through hole and the third through hole pass through the adjusting base from the rear side to the support side, the first through hole is disposed on a center of gravity of the adjusting base, and an extension direction of a first straight line, which passes through the first through hole and the second through hole, is different from an extension direction of a second straight line, which passes through the first through hole and the third through hole;
a fixed base, comprising a plurality of coupling holes respectively corresponding to the first through hole, the second through hole and the third through hole; and
a plurality of locking elements, passing through the first through hole, the second through hole and the third through hole of the adjusting base respectively and coupled to the coupling holes respectively, so as to couple the adjusting base to the fixed base, wherein the optical element is fixed on the support side of the adjusting base and the support side is away from the fixed base.

2. The optical element adjusting apparatus according to claim 1, wherein the optical element is a reflective element.

3. The optical element adjusting apparatus according to claim 1, further comprising a plurality of elastic elements respectively disposed around the locking elements and abutted between the fixed base and the adjusting base.

4. The optical element adjusting apparatus according to claim 3, wherein the adjusting base comprises a plurality of first limiting grooves, the fixed base comprises a plurality of second limiting grooves corresponding to the first limiting grooves respectively, and two ends of each of the elastic elements are disposed in the corresponding first limiting groove and the corresponding second limiting groove respectively.

5. The optical element adjusting apparatus according to claim 1, wherein the locking elements are screws, and the coupling holes are threaded holes.

6. The optical element adjusting apparatus according to claim 5, wherein each of the first through hole, the second through hole and the third through hole comprises a first hole portion and a second hole portion, the second hole portion is communicated with the first hole portion and is near the fixed base, a diameter of the first hole portion is larger than a diameter of the second hole portion, each of the locking elements includes a screw head and a screw rod connected to the screw head, an outer diameter of the screw head is larger than the diameter of the second hole portion and smaller than the diameter of the first hole portion, and an outer diameter of the screw rod is smaller than the diameter of the second hole portion.

7. The optical element adjusting apparatus according to claim 6, wherein each of the first through hole, the second through hole and the third through hole further comprises a tapered hole portion disposed between the first hole portion and the second hole portion, wherein a diameter of the tapered hole portion is gradually reduced in a direction from the first hole portion to the second hole portion to form a first arc surface on a hole wall of the tapered hole portion.

8. The optical element adjusting apparatus according to claim 7, wherein a surface of each of the screw heads, which faces to the first arc surface, is a second arc surface corresponding to the first arc surface.

9. The optical element adjusting apparatus according to claim 1, further comprising:
- an elastic sheet, disposed between the fixed base and the adjusting base, fixed to the adjusting base and comprising a plurality of abutting portions, wherein the adjusting base further comprises a plurality of fourth through holes, and the abutting portions respectively pass through the adjusting base via the fourth through holes and abut against a first surface of the optical element; and
- a limiting element, disposed on the support side of the adjusting base and covering an edge of a second surface of the optical element, wherein the first surface is opposite to the second surface.

10. The optical element adjusting apparatus according to claim 9, wherein the elastic sheet further comprises a fifth through hole, and the locking element passing through the first through hole further passes through the fifth through hole.

11. A projector, comprising:
- an illumination system, configured to provide an illumination light beam and comprising:
  - an optical element adjusting apparatus, comprising:
    - an adjusting base, comprising a first through hole, a second through hole, a third through hole, a support side and a rear side opposite to the support side, wherein the first through hole, the second through hole and the third through hole pass through the adjusting base from the rear side to the support side, the first through hole is disposed on a center of gravity of the adjusting base, and an extension direction of a first straight line, which passes through the first through hole and the second through hole, is different from an extension direction of a second straight line, which passes through the first through hole and the third through hole;
    - a fixed base, comprising a plurality of coupling holes respectively corresponding to the first through hole, the second through hole and the third through hole; and
    - a plurality of locking elements, passing through the first through hole, the second through hole and the third through hole of the adjusting base respectively and coupled to the coupling holes, so as to couple the adjusting base to the fixed base, wherein the support side of the adjusting base is away from the fixed base; and
  - an optical element, fixed on the support side of the adjusting base and configured to change optical characteristics or a transmission path of the illumination light beam;
- a light valve, disposed on the transmission path of the illumination light beam and configured to convert the illumination light beam to an image light beam; and
- a projection lens, disposed on a transmission path of the image light beam.

12. The projector according to claim 11, wherein the optical element is a reflective element.

13. The projector according to claim 11, wherein the optical element adjusting apparatus further comprises a plurality of elastic elements respectively disposed around the locking elements and abutted between the fixed base and the adjusting base.

14. The projector according to claim 13, wherein the adjusting base comprises a plurality of first limiting grooves, the fixed base comprises a plurality of second limiting grooves corresponding to the first limiting grooves respectively, and two ends of each of the elastic elements are disposed in the corresponding first limiting groove and the corresponding second limiting groove respectively.

15. The projector according to claim 11, wherein the locking elements are screws, and the coupling holes are threaded holes, each of the first through hole, the second through hole and the third through hole comprises a first hole portion and a second hole portion, the second hole portion is communicated with the first hole portion and is near the fixed base, a diameter of the first hole portion is larger than a diameter of the second hole portion, each of the locking elements includes a screw head and a screw rod connected to the screw head, an outer diameter of the screw head is larger than the diameter of the second hole portion and smaller than the diameter of the first hole portion, and an outer diameter of the screw rod is smaller than the diameter of the second hole portion.

16. The projector according to claim 15, wherein each of the first through hole, the second through hole and the third through hole further comprises a tapered hole portion disposed between the first hole portion and the second hole portion, wherein a diameter of the tapered hole portion is gradually reduced in a direction from the first hole portion to the second hole portion to form a first arc surface on a hole wall of the tapered hole portion.

17. The projector according to claim 16, wherein a surface of each of the screw heads, which faces to the first arc surface, is a second arc surface corresponding to the first arc surface.

18. The projector according to claim 11, the optical element adjusting apparatus further comprises:
- an elastic sheet, disposed between the fixed base and the adjusting base, fixed to the adjusting base and comprising a plurality of abutting portions, wherein the adjusting base further comprises a plurality of fourth through holes, and the abutting portions respectively pass through the adjusting base via the fourth through holes and abut against a first surface of the optical element; and
- a limiting element, disposed on the support side of the adjusting base and covering an edge of a second surface of the optical element, wherein the first surface is opposite to the second surface.

19. The projector according to claim 18, wherein the elastic sheet further comprises a fifth through hole, and the locking element passing through the first through hole further passes through the fifth through hole.

* * * * *